Dec. 27, 1949  V. H. EISLER ET AL  2,492,469
FILM SPROCKET CLAMP

Filed March 9, 1946  2 Sheets-Sheet 1

INVENTORS
VICTOR H. EISLER
AND
AUGUST WEIDNER

BY
*Bakelew & Leavitlebury*

ATTORNEYS

Dec. 27, 1949    V. H. EISLER ET AL    2,492,469
FILM SPROCKET CLAMP

Filed March 9, 1946    2 Sheets-Sheet 2

INVENTORS
VICTOR H. EISLER
AUGUST WEIDNER
BY
ATTORNEYS

Patented Dec. 27, 1949

2,492,469

UNITED STATES PATENT OFFICE 2,492,469

FILM SPROCKET CLAMP

Victor H. Eisler, Hollywood, and August Weidner, North Hollywood, Calif., assignors to Mitchell Camera Corporation, West Hollywood, Calif., a corporation of Delaware Application March 9, 1946, Serial No. 653,407

18 Claims. (Cl. 271—2.3)

1

This invention is concerned with improved means for releasably holding film in contact with film feeding sprockets in motion picture or other film handling equipment. Sprocket clamps in which the clamping rollers swing away from the axis of the sprocket to release the film are shown, for example, in the copending patent application of Henry N. Fairbanks, filed September 24, 1945, Ser. No. 618,160, now Patent No. 2,455,051. According to the present invention the film is released by axial motion of the clamping rollers relative to the sprocket. The principal objects of the invention are to produce a simple and very compact mechanism, which requires scarcely any more space when in the open position than when closed, and to facilitate rapid threading of the film on the sprocket by simplifying the relative motion of the parts.

The nature of our invention will be clearly understood from the two specific examples of its application which are described below. It will be obvious that the scope of our invention allows many variations from these two designs, which are illustrative only.

In describing the preferred embodiments of our invention, reference is made to the accompanying drawings, in which.

Figure 1:
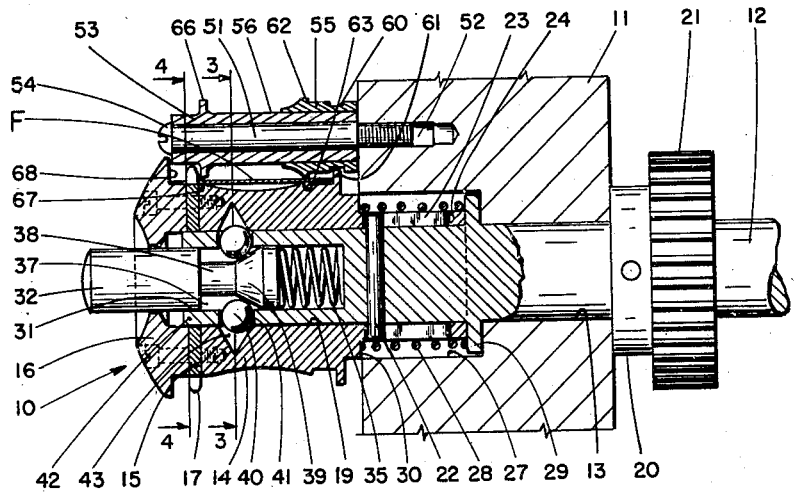
Fig. 1 is an axial section taken on line 1—1 of Fig. 3, showing the mechanism of the first embodiment of our invention in its film clamping position.
Figure 2:
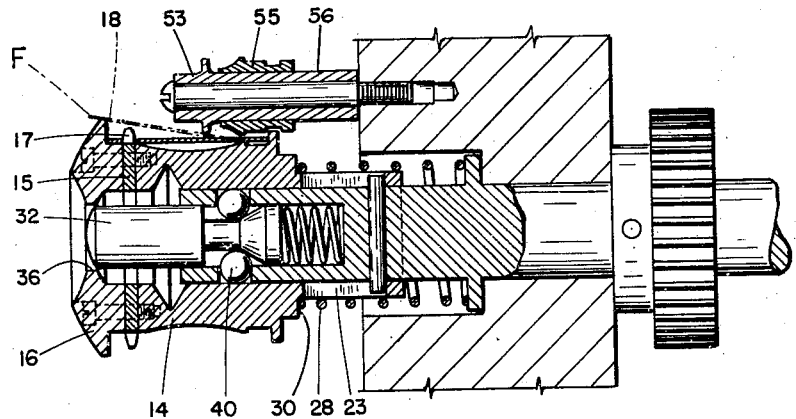
Fig. 2 is a similar section, showing the mechanism in its open position.
Figure 3:
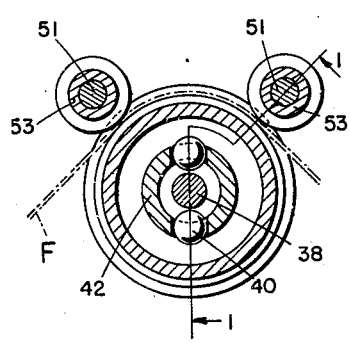
Fig. 3 is a transverse section, taken on line 3—3 of Fig. 1.

In the first illustrative embodiment of my invention, illustrated in Figs. 1 to 4, the film F is released by axial motion of the sprocket assembly 10 on its shaft 12 from the normal operating position shown in Fig. 1 to the open position shown in Fig. 2. The mechanism associated with this sliding motion of the sprocket assembly will first be described.

The sprocket assembly itself is preferably constructed as three separate parts, the sprocket hub

2

14, sprocket disk 15 and the sprocket cap 16, rigidly connected together by any suitable means such as the screws shown. The sprocket disk 15 has circumferentially spaced sprocket teeth 17, which engage perforations 18 in the film F, in the usual way. The sprocket assembly is axially bored out at 19 to fit freely on the sprocket shaft 12. This shaft is journalled in bearing 13 in the rigidly supported member 11, which we may suppose to be a part of the frame of the machine. The shaft and sprocket may be driven in any suitable way, for example by the gear 21, or motion of the film may be used to drive the sprocket, and hence, through the gear, to drive other mechanism. Or the sprocket may be a mere idler guide for the film. In the appended claims the expression "film drive and guide device" is intended to include all such uses.

Rotation of the sprocket assembly 10 with relation to shaft 12 is prevented, and its axial motion is limited, by the pin 22 in the shaft. The ends of this pin project from the shaft and fit slidingly in the longitudinal slots 23 in sleeve 24, which is preferably constructed as an integral part of sprocket hub 14. The bearing hole 13 in supporting member 11 is counterbored at 27, providing a well to receive sleeve 24 and also to accommodate the coil spring 28. This spring is confined at its inner end by the flange 29 on the shaft, and at its outer end by the shoulder 30 of sprocket hub 14. Its effect is therefore to urge the sprocket assembly outwardly on the shaft. The resulting outward motion of the sprocket is preferably limited by pin 22, and inward motion may be limited by the pin or by sleeve 24 engaging collar 29.

Provision is made to releasably lock the sprocket assembly 10 near the inner limit of its sliding motion on shaft 12, in the operating position shown in Fig. 1. The outer end of shaft 12 is bored out at 31 to receive the plunger 32. The central part of sprocket cap 16 is cut away at 36 to clear this plunger, which is urged outwardly by the coil spring 35. The circumferential groove 37 near the inner end of plunger 32 is formed with a cylindrical section 38 and, inward of this, a conical section 39. This conical surface is normally in contact with the steel balls 40, which are set in the apertures 41 in the tubular wall of the shaft. The action of spring 35, combined with the conical form of the surface 39, tends to press the balls 40 outwardly against the interior surface of sprocket hub 14. This surface is cut away at 43 to form a V-shaped groove or shoulder, so located that when the sprocket is pressed into its operating position (Fig. 1) the groove is nearly opposite apertures 41. Balls 40 then move radially outward under the influence of spring 35 to the positions shown in Fig. 1, where they forcibly engage the inner edge of groove 43. This overcomes the opposing force of spring 28, and presses the sprocket assembly back on its shaft into firm contact with flange 29, or other positive stop. The sprocket is thus effectively locked on its shaft in the correct operating position. If now the plunger 32 is pressed in momentarily, compressing spring 35, the balls 40 are free to move radially inward until they are stopped by the cylindrical portion 38 of the groove in the plunger. This portion of the groove is deep enough to allow the outer surfaces of the balls to drop below the external surface of shaft 12. The sprocket assembly 10 is thus free to slide outwardly on the shaft, under the influence of spring 28, until it is stopped by the pin 22 in the open position as shown in Fig. 2.

Figure 4:
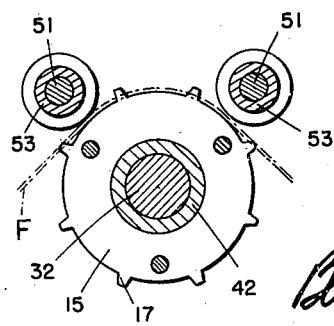
Fig. 4 is a transverse section, taken on line 4—4 of Fig. 1.
Figure 5:
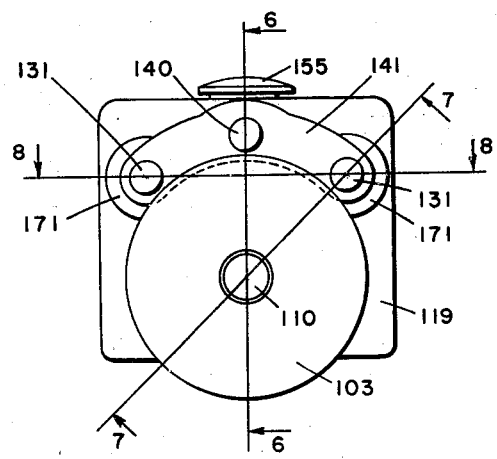
Fig. 5 shows an end view of the second embodiment of our invention.

As is shown in Fig. 4, the film F is held by the clamping rollers 53 in contact with the periphery of sprocket 15 through a sufficiently large arc to insure engagement of two or more sprocket teeth 17 with the perforations 18 of the film.

The clamping rollers 53 turn freely on fixed shafts 51. These are screwed into holes 52 in the supporting member 11, and are provided with heads 54 at their outer ends to retain the rollers in the correct longitudinal position with reference to sprocket assembly 10. The sprocket hub has a flange 61 just inside the inner edge of the film, and cap 16 a flange 68 just outside the outer edge. The lateral alignment of the film on the sprocket body is fixed by the sprocket teeth 17, and flanges 61 and 68 just clear the film edges. The inner surface of the film rides upon the flat surface 67 and is held close to this surface by the cooperating flanges 66 of the clamping rollers 53. The film also rides upon the flat surface 63 of the sprocket hub, against which it is held by flanges 62 of the clamping rollers. The surfaces 62 and 63 are so located that they touch the film only between the picture area in the central part of the film and the sound track area near the inner margin of the film. Both the sprocket hub and the clamping rollers are generously relieved, as shown in the figures, in order to avoid scratching the film in the above mentioned areas.

The film contacting flanges 62 are not integral parts of the clamping rollers 53, but are formed on the small sleeves 55, which fit freely over the cylindrical surfaces 56 of main rollers 53. This cylindrical surface 56 extends from the inner end of the roller nearly to the outer film contacting flange 66. The sleeve 55 is thus free not only to rotate upon roller 53 but also to slide axially along this cylindrical surface. The square groove 69 in sleeve 55 is so shaped as to receive flange 61 on the sprocket hub. The sleeve is thus constrained to slide in and out upon roller 53 with the sprocket itself, as can be seen clearly by comparing its position in Fig. 1 with that in Fig. 2. The sleeve 55, cooperating as described above with flange 61 on the sprocket hub, has the two principal functions of preventing interference between flange 61 and the film contacting flange 62 of the roller assembly when the sprocket is moved into its open position (Fig. 2); and of avoiding any possibility of the edge of the film slipping over flange 61, especially during the process of threading.

In operation, when it is desired to thread the film over the sprocket, which is assumed to be initially in its normal operating position as in Fig. 1, plunger 32 is first momentarily depressed with the finger. This unlocks the sprocket assembly, which springs out into the open position shown in Fig. 2. The film F can then readily be introduced between the sprocket and the two clamping rollers 53, as indicated by the dashed lines in the figure. In its introducing movement the film lies in such an angular position as indicated in Fig. 2. The outwardly projecting shoulder flange 68 of sprocket cap 16, whose diameter is larger than the external diameter of the sprocket teeth, prevents the film from contacting and being scratched by the teeth during introduction, as shown in Fig. 2. It guides the film over the teeth until the outer edge of the film drops down inside shoulder 68. As soon as that occurs, or as soon as the inner edge of the film contacts the flange 61 on the sprocket hub, the film is moved longitudinally one way or the other until the film perforations 18 drop over the sprocket teeth 17, bringing the film into the position shown in Fig. 2 by the solid line. It is then only necessary to push the sprocket assembly inward on its shaft by pressure against the rounded outer surface of the sprocket cap. The sprocket immediately becomes locked in its operating position by action of balls 40 and plunger 32, as has been explained above. This completes the threading operation. Ordinarily, it is not necessary to unthread the sprocket, but this can readily be accomplished by opening the sprocket as before by pressure upon the plunger 32, lifting the outer edge of the film into the position shown by the dashed lines, and withdrawing the film. The sprocket may then be returned to its operating position, or left open ready for threading with another film.

A second preferred embodiment of our invention is illustrated in Figs. 5 to 8. Here the sprocket is rigidly fixed upon its shaft, and the film is released by sliding the two clamping rollers back in a direction parallel to their axes and to that of the sprocket. Thus the relative motion of the sprocket and clamping rollers is the same as in the embodiment described above. Clearly the same relative motion of the parts can be obtained also in other ways, for example by allowing the sprocket to move in one direction and the clamping rollers in the other.

Figure 6:
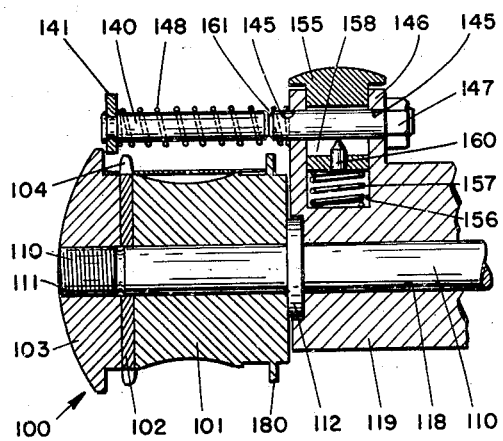
Fig. 6 is an axial section taken on line 6—6 of Fig. 5, showing the mechanism in the film clamping position.
Figure 7:
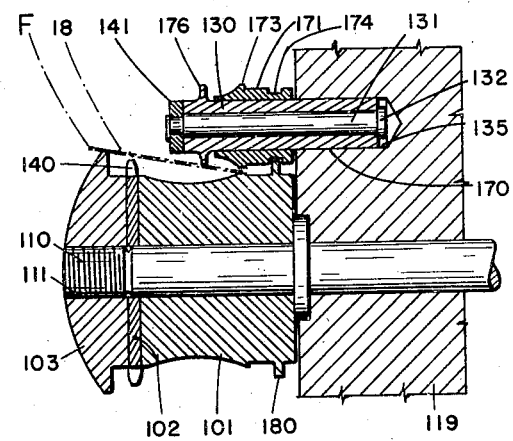
Fig. 7 is an axial section on line 7—7 of Fig. 5, showing the mechanism in its open position.
Figure 8:
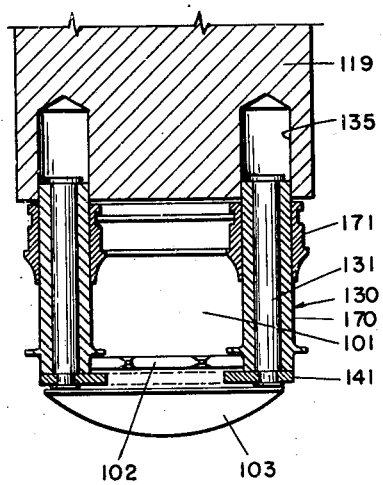
Fig. 8 is a section taken on line 8—8 of Fig. 5.

The construction of the sprocket assembly 100 is shown in Figs. 6 and 7. It is preferably constructed as before of three separate pieces, the sprocket hub 101, sprocket disk 102 and sprocket cap 103. As shown, the cap is screwed onto the threaded outer end 111 of the sprocket shaft 110, rigidly clamping the sprocket disk and hub against the flange 112 of the shaft. This flange also forms a thrust bearing at the outer end of the bearing 118 in which the shaft is journalled. The bearing 118 is shown mounted in the member 119, which may be considered to be a part of the rigid frame of the machine.

The clamping rollers 130 are not mounted independently, as in the previous modification, but the shafts 131 upon which they rotate are linked together and to the guide pin 140 by the yoke 141. This guide pin 140 slides in the holes 145, which are drilled parallel to the sprocket axis in the block-like extension 146 of the main supporting member 119. The guide pin is normally held at the forward limit of its sliding motion by pressure of the coil spring 148, its motion being limited in this direction by the nut 147.

The above described sliding motion of the guide pin 140 is imparted by yoke 141 to roller shafts 131. The outer ends of these shafts are riveted to the yoke and the inner ends are formed with the flanges 132, which serve to retain the rollers 130 upon the shafts. The inner ends of the rollers 130 enter and are guided by the holes 135 in the supporting blocks 119, the depth of these holes being sufficient to allow the rollers to slide axially from the normal operating position shown in Fig. 6, to the open position shown in Fig. 7.

Provision is made to lock the guide pin, and hence the entire clamping roller assembly, temporarily in the open position. In the preferred embodiment shown, this comprises the plunger 155, sliding in the hole 156 whose axis intersects that of guide pin 140 at right angles. This plunger is provided with the transverse hole 158 through which guide pin 140 passes with ample clearance. The plunger is urged upwardly in its hole by the coil spring 157. When guide pin 140 and the rollers 130 are pressed into the position indicated in Fig. 7, a locking element 160 on plunger 155 is pressed into a groove 161 in guide pin 140 to lock the pin and rollers 130 in their inner or open positions. After the film has been threaded, momentary manual pressure on the rounded top surface of plunger 155 frees the latch 160 from groove 161, allowing the guide pin and clamping rollers to be returned by spring 148 to their operating position (Fig. 6).

The film guiding surfaces of the sprocket and clamping rollers are entirely analogous to those of the first modification. In particular, each clamping roller 130 is formed with a relatively long cylindrical surface 170 upon which the sleeves 171 are free to rotate and slide. As before, these sleeves are provided with the raised film contacting surfaces 173 and the grooves 174 which cooperate with flange 180 on the sprocket hub 101. Interaction of the flange 180 with grooves 174 holds the sleeves 171 in a definite relationship to the sprocket hub 101. This relationship is maintained even when the clamping roller assembly is moved from its operating to its open position, the sleeves sliding upon the cylindrical surfaces 170 of their respective rollers. As before, this avoids interference between flange 180 on the sprocket hub and film contacting surfaces 173 of the roller assembly, and also prevents the inner edge of the film from slipping over flange 180 during the process of threading. The outer film engaging surfaces 176 of rollers 130, which are just inside the sprocket teeth 104 during normal operation, are far enough inside these teeth in the open position to allow ample clearance for insertion or withdrawal of the film, as indicated by the dashed lines in Fig. 7. The flange of cap 103 plays the same part as before described for cap 16.

We claim:

1. In film drive and guide devices which include two film engaging elements, one of said elements being a sprocket drum which is rotatably mounted on and projects outwardly axially from a mounting member, and which has a circumferential set of projecting sprocket teeth adapted to engage a perforated film, the other of said elements being a film confining element mounted on the mounting member and projecting outwardly therefrom to normally overlie the sprocket drum in film confining relation at a point just inward of the sprocket teeth; means in association with the mounting of at least one of said elements whereby that element is movable relatively to the other from normal position in a direction parallel to the sprocket drum axis to a position in which the overlying point of the film confining element is spaced inwardly of the sprocket teeth, whereby a film being introduced between the two elements may have its outer edge portion lifted away from the sprocket teeth, and means for releasably holding the two elements in their normal relative positions and against said relative axial movement.

2. A film drive and guide device as defined in claim 1 and in which the sprocket teeth are located near the outer end of the sprocket drum and also including a secondary film confining member overlying the inner end portion of the sprocket drum, means whereby said secondary member and the sprocket drum are locked against relative axial movement, the outer end of said confining secondary member being spaced axially inwardly of the sprocket teeth on the sprocket drum.

3. A film drive and guide device as defined in claim 2 and in which the sprocket teeth are located near the outer end of the sprocket drum and in which the sprocket drum has outside the sprocket teeth a film guiding flange of a diameter somewhat larger than the outside diameter of the teeth.

4. In film drive and guide devices which include two film engaging elements, one of said elements being a sprocket drum which is rotatably mounted on and projects outwardly axially from a mounting member, and which has a circumferential set of projecting sprocket teeth adapted to engage a perforated film, the other of said elements being a film confining element mounted on the mounting member and projecting outwardly therefrom to normally overlie the sprocket drum in film confining relation at a point just inward of the sprocket teeth; means in association with the mounting of at least one of said elements whereby that element is movable relatively to the other from normal position in a direction parallel to the sprocket drum axis to a position in which the overlying point of the film confining element is spaced inwardly of the sprocket teeth, whereby a film being introduced between the two elements may have its outer edge portion lifted away from the sprocket teeth, and spring actuated means for releasably holding the two elements in their normal relative positions and against said relative axial movement.

5. A film drive and guide device as defined in claim 4 and in which the sprocket teeth are located near the outer end of the sprocket drum and also including a secondary film confining member overlying the inner end portion of the sprocket drum, means whereby said secondary member and the sprocket drum are locked against relative axial movement, the outer end of said secondary confining member being spaced axially inwardly of the sprocket teeth on the sprocket drum.

6. A film drive and guide device as defined in claim 4 and in which the sprocket teeth are located near the outer end of the sprocket drum and in which the sprocket drum has outside the sprocket teeth a film guiding flange of a diameter somewhat larger than the outside diameter of the teeth.

7. In film drive and guide devices which include two film engaging elements, one of said elements being a sprocket drum which is rotatably mounted on and projects outwardly axially from a mounting member, and which has a circumferential set of projecting sprocket teeth adjacent its outer end adapted to engage a perforated film, the other of said elements being a film confining roller rotatably mounted on the mounting member and projecting outwardly axially therefrom parallel with the sprocket drum, the roller having a projecting flange near its outer end which normally overlies the sprocket drum in film confining relation at a point just inward of the sprocket teeth; means in association with the mounting of at least one of said elements whereby that element is movable relatively to the other from normal position in a direction parallel to the sprocket drum axis to a position in which the overlying point of the film confining flange is spaced inwardly of the sprocket teeth, a secondary film confining roller co-axial with and axially slidable with respect to the first mentioned roller, and interengaging means on the sprocket drum near its inner end and on the secondary roller, whereby that roller and the sprocket are held against relative axial movement, the outer end of said secondary roller being spaced axially inwardly of the sprocket teeth on the sprocket drum.

8. A film drive and guide device as defined in claim 7 and in which the sprocket drum has outside the sprocket teeth a film guiding flange of a diameter somewhat larger than the outside diameter of the teeth.

9. In film drive and guide devices which include two film engaging elements, one of said elements being a sprocket drum which is rotatably mounted on and projects outwardly axially from a mounting member, and which has a circumferential set of projecting sprocket teeth adjacent its outer end adapted to engage a perforated film, the other of said elements being a film confining roller rotatably mounted on the mounting member and projecting outwardly axially therefrom parallel with the sprocket drum, the roller having a projecting flange near its outer end which normally overlies the sprocket drum in film confining relation at a point just inward of the sprocket teeth; the mounting of the sprocket drum comprising an axial shaft on which the drum is slidably mounted to be moved outwardly from its normal position, a secondary film confining roller co-axial with and axially slidable with respect to the first mentioned roller, and interengaging means on the sprocket drum near its inner end and on the secondary roller, whereby that roller and the sprocket are held against relative axial movement.

10. A film drive and guide device as defined in claim 9 and in which the sprocket teeth are located near the outer end of the sprocket drum and in which the sprocket drum has outside the sprocket teeth a film guiding flange of a diameter somewhat larger than the outside diameter of the teeth.

11. In film drive and guide devices which include two film engaging elements, one of said elements being a sprocket drum which is rotatably mounted on and projects outwardly axially from a mounting member, and which has a circumferential set of projecting sprocket teeth adapted to engage a perforated film, the other of said elements being a film confining element mounted on the mounting member and projecting outwardly therefrom to normally overlie the sprocket drum in film confining relation at a point just inward of the sprocket teeth; the mounting of the film confining element embodying relatively sliding mounting elements whereby the confining element may be moved inwardly of its normal position to a position in which the overlying point of the film confining element is spaced inwardly of the sprocket teeth, whereby a film being introduced between the two elements may have its outer edge portion lifted away from the sprocket teeth, and releasable means for normally holding the confining element in its normal position.

12. A film drive and guide device as defined in claim 11 and in which the sprocket teeth are located near the outer end of the sprocket drum and the sprocket drum has a film guiding flange outside the sprocket teeth and of a diameter somewhat larger than the outside diameter of the teeth.

13. In film drive and guide devices which include two film engaging elements, one of said elements being a sprocket drum which is rotatably mounted on and projects outwardly axially from a mounting member, and which has a circumferential set of projecting sprocket teeth adjacent its outer end adapted to engage a perforated film, the other of said elements being a film confining roller rotatably mounted on the mounting member and projecting outwardly axially therefrom parallel with the sprocket drum, the roller having a projecting flange near its outer end which normally overlies the sprocket drum in film confining relation at a point just inward of the sprocket teeth; the mounting of the confining roller embodying relatively sliding elements whereby the confining roller may be moved axially inwardly to a position where its film confining flange is spaced inwardly of the sprocket teeth, a secondardy film confining roller co-axial with and axially slidable with respect to the first mentioned roller, and interengaging means on the sprocket drum near its inner end and on the secondary roller, whereby that roller and the sprocket are held against relative axial movement, the outer end of said secondary roller being spaced axially inwardly of the sprocket teeth on the sprocket drum.

14. A film drive and guide device as defined in claim 13 and in which the sprocket drum has outside the sprocket teeth a film guiding flange of a diameter somewhat larger than the outside diameter of the teeth.

15. In film drive and guide devices which include two film engaging elements, one of said elements being a sprocket drum which is rotatably mounted on and projects outwardly axially from a mounting member, and which has a circumferential set of projecting sprocket teeth near its outer end adapted to engage a perforated film, the other of said elements being a film confining element mounted on the mounting member and projecting outwardly therefrom to normally overlie the sprocket drum in film confining relation; the improvement which comprises the combination of formation on the film confining element which confines the film against the sprocket drum exclusively inwardly of the sprocket teeth, means in association with the mounting of the confining element holding it against outward movement with relation to the mounting member, means in association with the mounting of the sprocket drum whereby the drum is movable axially outwardly from its normal position to move its sprocket teeth to a position spaced outwardly from the confining member, and releasable means for holding the sprocket drum in its normal position.

16. The improvement defined in claim 15 and also comprising a film guiding flange on the outer end of the sprocket drum outside the sprocket teeth and of a diameter larger than the outside diameter of the teeth.

17. The improvement defined in claim 15 and also comprising a secondary axially movable film confining member overlying the inner end portion of the sprocket drum, and means locking the secondary member and the sprocket drum together for common movement in an axial direction.

18. The improvement defined in claim 17 and in which the said locking means embodies a film-edge guiding flange projecting radially from the inner end of the sprocket drum.

VICTOR H. EISLER.
AUGUST WEIDNER.

REFERENCES CITED

The following references are of record in the file of this patent:

UNITED STATES PATENTS

| Number | Name | Date |
|---|---|---|
| 1,966,857 | Goldhammer et al. | July 17, 1934 |
| 1,972,555 | Fear | Sept. 4, 1934 |
| 2,455,051 | Fairbanks | Nov. 30, 1948 |

FOREIGN PATENTS

| Number | Country | Date |
|---|---|---|
| 633,127 | Germany | July 20, 1936 |

Certificate of Correction

Patent No. 2,492,469 December 27, 1949

VICTOR H. EISLER ET AL.

It is hereby certified that errors appear in the printed specification of the above numbered patent requiring correction as follows:

Column 6, line 19, for the words "confining secondary" read *secondary confining*; line 23, for the claim reference numeral "2" read *1*;

and that the said Letters Patent should be read with these corrections therein that the same may conform to the record of the case in the Patent Office.

Signed and sealed this 12th day of September, A. D. 1950.

[SEAL]

THOMAS F. MURPHY,
*Assistant Commissioner of Patents.*